United States Patent [19]
Fallah et al.

[11] Patent Number: 5,539,188
[45] Date of Patent: Jul. 23, 1996

[54] SYSTEM FOR THE IDENTIFICATION OF CONTAINERS, NOTABLY GAS CYLINDERS

[75] Inventors: Michel Fallah, Groupe Provence-Bâtiment B; Michel Leduc, Lotissement Cabassade, both of France

[73] Assignee: Gemplus Card International, Gemonos, France

[21] Appl. No.: 244,501

[22] PCT Filed: Dec. 16, 1992

[86] PCT No.: PCT/FR92/01191

§ 371 Date: May 27, 1994

§ 102(e) Date: May 27, 1994

[87] PCT Pub. No.: WO93/13494

PCT Pub. Date: Jul. 8, 1993

[30] Foreign Application Priority Data

Dec. 20, 1991 [FR] France .................. 91 15953

[51] Int. Cl.⁶ .................................. G06F 17/00
[52] U.S. Cl. ............................... 235/375; 235/491
[58] Field of Search .................... 235/491, 492, 235/382, 375

[56] References Cited

U.S. PATENT DOCUMENTS

| | | |
|---|---|---|
| 4,521,676 | 6/1985 | Poulsen ................... 235/375 |
| 4,590,461 | 5/1986 | Cooper .................... 340/572 |
| 4,827,643 | 5/1989 | Hearst et al. ............. 40/306 |
| 4,873,533 | 10/1989 | Oike ....................... 343/744 |
| 4,918,296 | 4/1990 | Fujisuka et al. ............ 235/380 |
| 4,973,944 | 11/1990 | Maletta ................. 340/572 X |
| 5,151,684 | 9/1992 | Johnsen ................... 340/572 |
| 5,191,992 | 3/1993 | Darley ..................... 220/214 |
| 5,231,273 | 7/1993 | Caswell et al. ............. 235/385 |
| 5,241,160 | 8/1993 | Bashan et al. ............. 235/380 |
| 5,249,380 | 10/1993 | Fast ........................ 40/299 |
| 5,280,159 | 1/1994 | Schultz et al. ......... 235/380 X |

FOREIGN PATENT DOCUMENTS

| | | |
|---|---|---|
| 0176090 | 4/1986 | European Pat. Off. . |
| WO8604878 | 8/1986 | European Pat. Off. . |
| 2499273 | 8/1982 | France . |
| 2623311 | 5/1989 | France . |
| WO9103027 | 3/1991 | Germany . |
| 0066390 | 3/1987 | Japan ..................... 235/375 |
| 2077555 | 12/1981 | United Kingdom . |

*Primary Examiner*—Donald T. Hajec
*Assistant Examiner*—Steven Wigmore
*Attorney, Agent, or Firm*—Nilles & Nilles

[57] ABSTRACT

The system includes an electronic label (1) and a data terminal (6). The electronic label (1) is provided with a device for the emitting of electromagnetic waves (8) fixed to a ring (2) of the bottom of the protective bell (5). The data terminal (6) is coupled to a detachable read/write head (7) that can be inserted, as desired, into the bell (5) directly facing the label (1) bearing ring (2) to transmit information elements between the data terminal (6) and the label. The system may be used for the automatic identification of gas cylinder type articles.

20 Claims, 2 Drawing Sheets

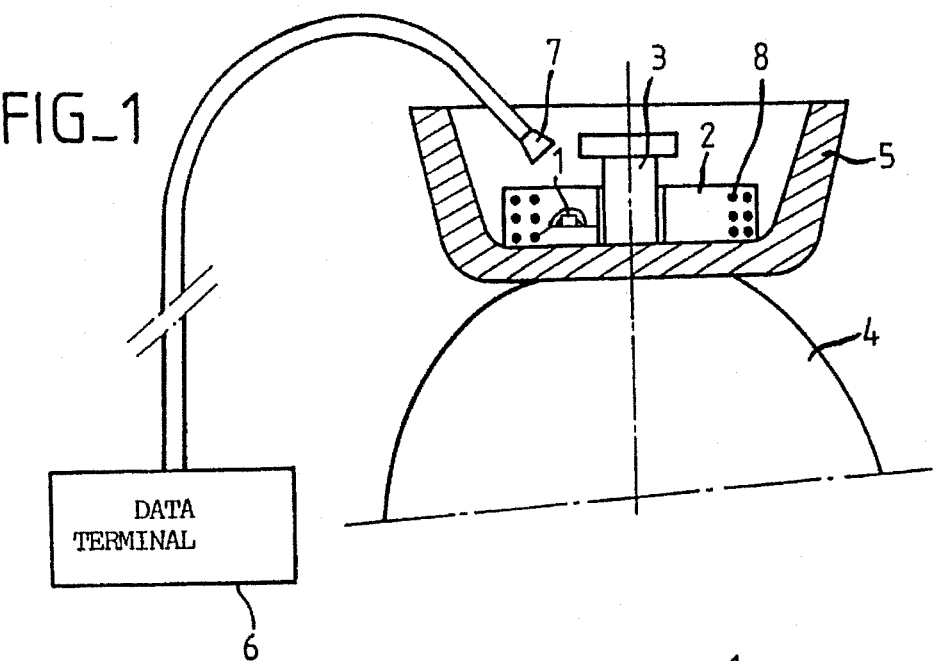
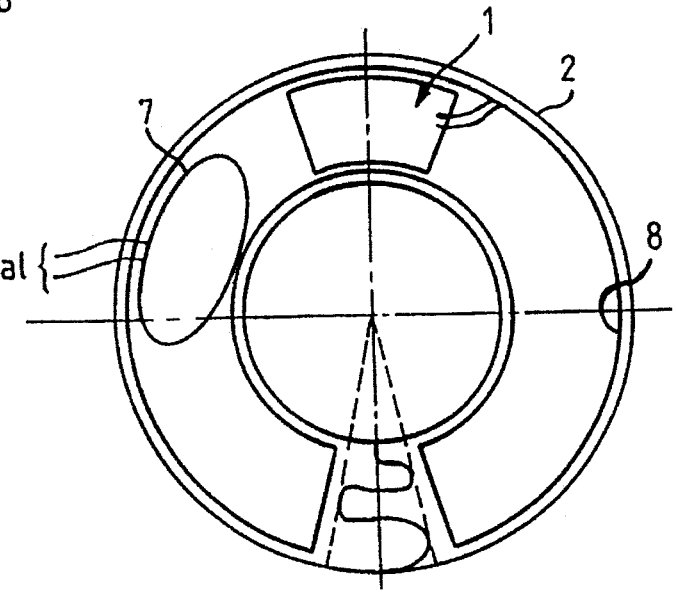
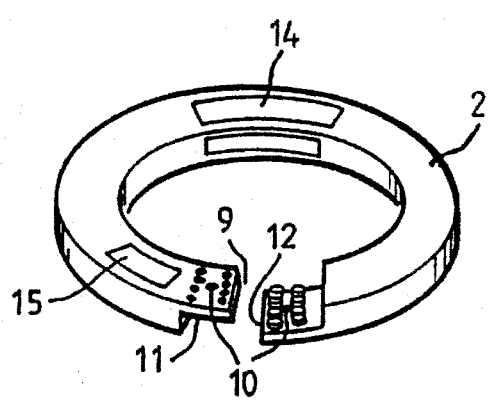
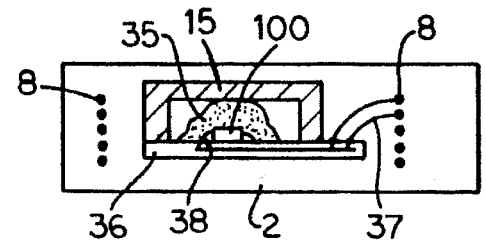

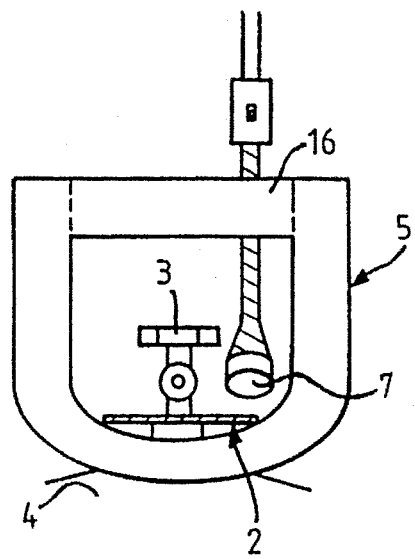
FIG_3a
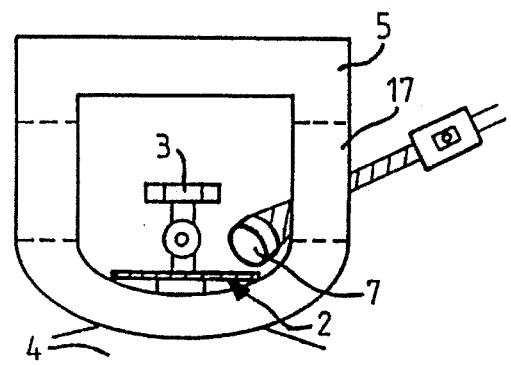
FIG_3b
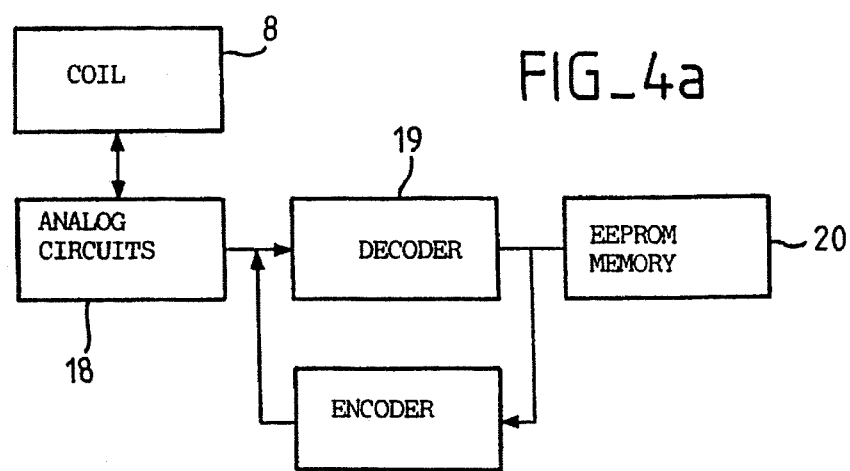
FIG_4a
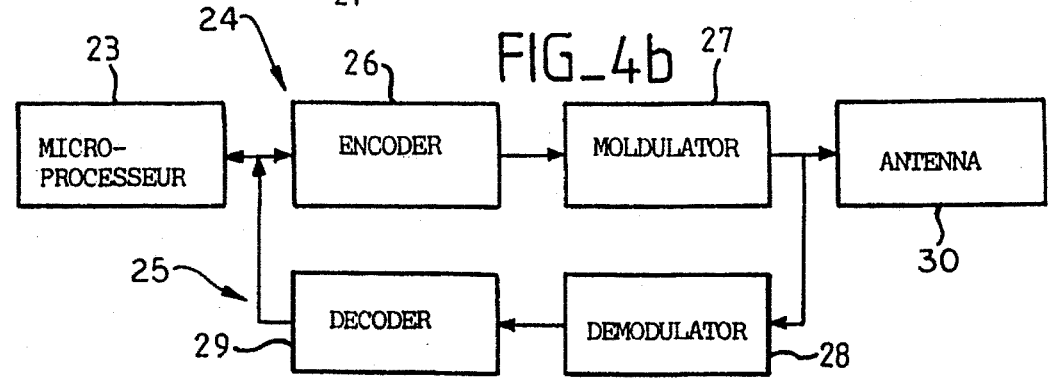
FIG_4b

SYSTEM FOR THE IDENTIFICATION OF CONTAINERS, NOTABLY GAS CYLINDERS

The present invention relates to a system for the identification of containers, notably gas cylinders.

There are known ways of locating, identifying and labelling items such as gas cylinders in gas-filling plants. The numbers affixed to these cylinders can be used to keep track of them during the operations that precede or follow their being filled in the plant. This tracking or follow-up is done notably during cylinder-sorting operations, when the cylinders are unloaded from carrier trucks, when they are filled and then when they are packed in delivery racks or cases, and also when the delivery orders are being prepared as well as when the cylinders are delivered to the customers.

To prevent the labels from being damaged or possibly detached from the cylinders during handling operations in the plant, or when they are being transported, precautions are generally taken to provide mechanical protection means on the cylinders. One efficient method of protection consists, for example, in fastening the labels to the interior of a bell-shaped part that generally encloses the tap of the cylinder. This provides the label with efficient mechanical protection against tearing and at the same time protects the tap against any accidental handling. Unfortunately, this arrangement rules out any possibility of the automatic optical reading of the inscriptions on the labels since these labels are masked by the cover provided by the tap-protecting bell. Furthermore, the fact that the bell is generally made of metal rules out any possibility of using electronic labels provided with devices that emit radioelectric waves for example, since the metal cover behaves like a screen that is opaque to electromagnetic waves.

The aim of the invention is to overcome the above-mentioned drawbacks.

To this end, an object of the invention is a system for the identification of containers shut by by a tap that is surrounded by a protective bell characterized in that said system comprises, firstly an electronic label provided with a device for emitting electromagnetic waves coupled to a memory and, secondly, a data terminal coupled to a detachable read/write head comprising a transceiver of electromagnetic waves that can be introduced, as desired, into the tap-protecting bell to transmit information elements between the memory of the electronic label and the data terminal.

The main advantages of the invention are, firstly, that it enables reliable reading of the information elements contained in the labels, whatever the nature of the rough treatment and mishandling undergone by the cylinders during their transportation or during their packaging and, secondly, that it provides a solution that is perfectly suited to the dynamic labelling of gas cylinders for example.

Other features and advantages of the invention shall be seen here below from the following description, made with reference to the appended drawings, of which:

FIG. 1 shows a system for the identification of containers according to the invention;

FIG. 2a shows an embodiment of a ring wherein the ring has a coil embedded therein which substantially matches the shape of the ring;

FIG. 2b shows another embodiment of a ring wherein the ring has a riveting type of closing device;

FIG. 2c shows another embodiment of a ring wherein the ring has a reinforced zone for housing an electronic label;

FIGS. 3a and 3b show two embodiments respectively of the electronic module of the label and of the read/write head forming the system according to the invention;

FIGS. 4a and 4b show two possible modes of introducing the read/write head into the protective bell of the tap.

The cylinder-identification system according to the invention, shown schematically in FIG. 1, essentially comprises an electronic label 1, in the form of a small-sized patch supported by a ring 2 surrounding a tap 3 used to close a container 4 which, in FIG. 1, takes the form of a gas cylinder. The ring 2 is fixed to the bottom of a protective bell 5 of the tap 3. This system also includes a data terminal 6 that has the role, by means of a read/write head 7, of recognizing the presence of the label, identifying it and, if necessary, of recording information elements therein.

The label 1 and the read/write head 7 are coupled together electromagnetically, firstly by means of a single coil 8 that is embedded in the body of a ring 2 and electrically connected to the label 1 and, secondly, by means of two ferrite coils (not shown) placed in the read/write head 7. The coupling takes place when the read head 7 and the ring 2 are placed substantially in a position of facing each other, as shown for example in the diagram of FIG. 2a. This figure shows a label 1 formed by an electronic module 100. The electronic module is coupled to the coil 8. The module and the coil are both embedded inside a plastic resin forming the ring 2. In this embodiment, the shape of the coil substantially matches that of the ring 2 in order to provide a maximum surface area of electromagnetic radiation. In a preferred variant, the coil 8 has, for this purpose, strands that are stretched out on the external and internal peripheries of the ring. These strands get looped with one another in such a way that the surface of the crown formed by the ring constitutes the useful surface area of transmission of the electromagnetic waves. The antenna thus constituted forms a loop as illustrated by the embodiment of FIG. 2a.

For the transmission of information elements between the label 1 and the read head 7, it is therefore preferable that this head 7 should be positioned so as to be facing the inner surface of the coil 8, before the crown.

The ring is detachable and may be installed on a stock of cylinders not yet been provided with such a system. Indeed, to enable the ring to be positioned around the tap 3, this tap is slotted by means of a slot 9. It has a clip-on or riveting type of closing device 10, positioned as illustrated by the embodiment of FIG. 2b. This device 10 has two inside recesses 11 and 12 designed to overlap in order to form catches that close the slot 9. To enable the ring 2 to be easily positioned around the tap 3, the ring 2 has a flexible region 14, diametrically opposite the slot 9, that permits the ring to be subjected to twisting or torsion in this region. This flexible region is obtained, for example, by giving an appropriate size to the section of the ring in the region 14, notably by reducing its dimensions. It is also possible to hollow out the ring at the position of this flexible region. By contrast, at one of its ends close to the slot 9, the ring 2 has a reinforced zone 15 set aside for housing the label 1. Reference may be made to the drawing of FIG. 2c for a clearer picture of an embodiment of the ring 2 having these structural details. Indeed, in a preferred embodiment, the electronic module 100 is a chip bonded to a printed circuit 36, this chip being covered with a drop of protective resin. The reinforcement zone 15 is obtained, for example, by placing a rigid cap above the chip. The cap may be made of metal. The contact wires 37 are connected to the coil 8. The wires 37 are connected to the contact wires 38 of the chip through the printed circuit 36.

The introduction of the read/write head into the bell 5 in order to transmit information elements between the data terminal 6 and the label 1 takes place according to the modes shown in FIGS. 3a and 3b. In the mode of introduction shown in FIG. 3a, the read head is introduced by the upper aperture 16 of the bell 5. In the mode shown in FIG. 3b, the read/write head 7 is introduced through a side window 17 made in the very body of the bell 5.

The label comprises, in the manner described for example in the French patent No. 2 623 311, an electronic module formed by logic and analog circuits and by storage circuits connected to the coil 8. The analog circuits 18 firstly pick up the electromagnetic energy given by the read/write head to supply the internal circuits of the label. Secondly, they carry out the reception of the signals that are sent by the read/write head and picked up by the coil 8. The logic circuits essentially comprise a decoder 19 to decode the signals transmitted by the read/write head 7 and to apply them by means of a shift register to the data inputs of an EEPROM memory 20, of the type marketed under the reference NM9346 by the US-registered firm National Semiconductor for example, and an encoder 21 to convert the data elements read in the EEPROM memory 20 into analog signals in order to transmit them to the read/write head 7.

The read/write head comprises a microprocessor 23 coupled, firstly, to the data terminal 6 by means of an interface circuit (not illustrated) and, secondly, to an electromagnetic transmission device 24 and electromagnetic reception device 25 respectively comprising a transmission encoder 26 coupled to a modulation stage 27 and a demodulator 28 coupled to a decoder 29. The antenna 30 is constituted by a ferrite coil. The entire system is placed at the end of a flexible cable provided with a grip to make it easier to insert the read/write head into the bell. The flexible cable has a length that may vary depending on whether it is designed to be installed in a fixed station or a portable terminal. Naturally, to obtain reliable operation of the system, the read head should preferably be placed so as to be sufficiently close to the label.

We claim:

1. A system for the identification of containers closed by a tap that is surrounded by a protective socket, the system comprising:

an electronic label coupled to a coil, the electronic label being attached to a ring surrounding the tap at a bottom of the protective socket, the electronic label further comprising an electronic module coupled to the coil, the shape of the coil substantially matching that of the ring; and a data terminal coupled to a detachable read/write head the read/write head being inserted into the protective socket, the read/write head being disposed adjacent the coil, and the read/write head directly facing the coil, the coil and the read/write head being electromagnetically coupled so as to define an electromagnetic transmission path which permits the transmission of information elements between the data terminal and the electronic label.

2. The system according to claim 1, wherein the ring has a slot formed therein, and wherein the ring includes a closing device to close the ring.

3. The system according to claim 1, wherein the coil comprises strands distributed on inner and outer peripheries of the ring so as to form a loop.

4. The system according to claim 1, wherein the electronic module and the coil are attached to the ring.

5. The system according to claim 2, wherein the electronic module and the coil are embedded by molding in material forming the ring.

6. The system according to claim 1, wherein the ring is made of plastic.

7. The system according to claim 1, wherein the ring is detachable.

8. The system according to claim 2, wherein the slot is formed by two inside recesses at ends of the ring.

9. The system according to claim 8, wherein the closing device is formed by riveting the two inside recesses of the ring.

10. The system according to claim 2, wherein the ring is closed by clipping two ends of the ring.

11. The system according to claim 1, wherein the ring has a flexible zone permitting the application of torsional forces, the flexible zone being diametrically opposite the slot.

12. The system according to claim 11, wherein the dimensions of the ring are reduced in the flexible zone, the reduction of dimension forming the flexible zone.

13. The system according to claim 11, wherein the ring is hollowed in the flexible zone, the hollowing of the ring forming the flexible zone.

14. The system according to claim 1, wherein the ring has a reinforced zone.

15. The system according to claim 14, wherein the reinforced zone is formed around the electronic module.

16. The system according to claim 1, wherein the electronic module is embedded in the ring adjacent the slot.

17. The system according to claim 1, wherein the electronic module is an integrated circuit chip.

18. A method of identifying a gas cylinder, the method comprising the steps of:

surrounding a tap of the gas cylinder with a ring, the ring having an electronic label and an antenna coil embedded therein, the electronic label being coupled to the coil, the coil having a shape substantially matching that of the ring;

placing a detachable read/write head adjacent the ring so that the read/write head faces the ring;

emitting electromagnetic energy from the detachable read/write head in the form of electromagnetic waves;

absorbing in the coil at least a portion of the electromagnetic energy emitted by the detachable read/write head;

supplying power to the electronic label using at least a portion of the electromagnetic energy absorbed by the coil;

processing signals sent by the detachable/write head in the coil, the signals being carried by the electromagnetic waves; and transmitting a signal from the coil to the detachable read/write head, the signal being transmitted in response to the electromagnetic energy absorbed by the coil.

19. A method according to claim 18, wherein the step of surrounding the tap of the gas cylinder with the ring further comprises the steps of:

providing a flexible zone in the ring;

providing a slot in the ring;

closing the ring so as to minimize a gap created by the slot, the closing step including the step of subjecting the ring to twisting in the flexible zone.

20. A method according to claim 18, wherein the processing step comprises the steps of decoding the signals sent by the detachable read/write head;

applying the decoded signals to data inputs of an EEPROM memory; and converting data elements read from data outputs of the EEPROM memory into analog signals.

* * * * *